United States Patent [19]

Stringaro

[11] Patent Number: 5,350,566
[45] Date of Patent: Sep. 27, 1994

[54] REACTOR FOR HETEROGENEOUS REACTIONS WITH A CATALYST MEMBER

[75] Inventor: Jean-Paul Stringaro, Bulach, Switzerland

[73] Assignee: Sulzer Brothers Limited, Winterthur, Switzerland

[21] Appl. No.: 95,826

[22] Filed: Jul. 21, 1993

Related U.S. Application Data

[63] Continuation of Ser. No. 607,149, Oct. 31, 1990, abandoned.

[30] Foreign Application Priority Data

Dec. 11, 1989 [CH] Switzerland .................. 0446/89

[51] Int. Cl.$^5$ ............................................. B01J 8/00
[52] U.S. Cl. .................... 422/109; 422/191; 422/192; 422/202; 422/222; 422/224
[58] Field of Search ............ 422/191, 192, 202, 222, 422/109, 224; 502/527

[56] References Cited

U.S. PATENT DOCUMENTS

| | | | |
|---|---|---|---|
| 4,268,482 | 5/1981 | Arashi et al. | 422/191 |
| 4,719,090 | 1/1988 | Masaki | 422/191 |
| 4,731,229 | 3/1988 | Sperandio | 422/191 |
| 5,037,619 | 8/1991 | Alagy et al. | 422/191 |

FOREIGN PATENT DOCUMENTS

| | | |
|---|---|---|
| 0025308 | 3/1981 | European Pat. Off. . |
| 0208929 | 1/1987 | European Pat. Off. . |
| 700639 | 4/1987 | Fed. Rep. of Germany . |
| 3826155 | 2/1989 | Fed. Rep. of Germany . |

Primary Examiner—Timothy M. McMahon
Attorney, Agent, or Firm—Francis C. Hand

[57] ABSTRACT

The catalytic reactor has a catalyst member in the form of a stage of different orientations from one another and with flow-guiding elements which form crossing subflow ducts and which have a catalyst thereon. The flow-guiding elements are at an angle of inclination W of at least 10° to the main flow direction and form partly open flow-crossing places between the subflows. The height H of a stage corresponds to a displacement factor H/HO of at least ½ where HO=Dctg W and D equals the diameter (or width) of the catalyst member. Satisfactory homogenization of the catalytic reaction and satisfactory heat removal via the heat-conductive rector wall are therefor achieved. The selectivity of the chemical reaction is improved and slip substantially obviated.

21 Claims, 8 Drawing Sheets

Fig. 2 ctg W = H0/D

REACTOR FOR HETEROGENEOUS REACTIONS WITH A CATALYST MEMBER

This is a continuation of U.S. patent application Ser. No. 07/607,149 filed on Oct. 31, 1990, now abandoned.

This invention relates to a reactor for heterogeneous reactions with a catalyst member.

Heretofore, various types of catalytic reactors have been known for carrying out heterogeneous reactions utilizing a catalyst member. For example, catalytic reactors have been known which are in the form of single-tube or multi-tube reactors with bulk fills or monoliths, usually of extruded structures, parallel ducts, or rolled-up wavy structures, usually of coated sheet metal, being used as catalyst members. However, these known reactors have considerable disadvantages. For instance, bulk fills are associated with severe pressure drops and poor heat removal. Monoliths and coiled or wound wavy structures provide no radial mixing, experience poor heat removal and slip, and permit non-homogeneous concentration and temperature profiles to occur.

It has also been known from Swiss Patent 537,208 to use a static mixer structure with a catalytically active material in a reactor. However, this is unsuitable particularly for catalytic reactions in which there is a significant evolution of heat since the requisite removal of heat cannot be provided for and the necessary temperature range for a given catalytic reaction cannot be maintained. There is also the risk of high peak temperatures and local hot spots in the known reactors.

European Patent Application 0025308 describes an apparatus for contacting a fluid with the wall of a vessel through a structure within the vessel having passages angled to the general direction of flow in the vessel and through a space between the structure and the vessel wall. As described, the structure within the vessel may carry a catalytic coating with the structure being suitable for endothermal tubular steam hydrocarbon reforming. However, since the structure still consists of parallel ducts which are separated from one another, e.g. honeycomb monoliths, the problems mentioned above cannot be solved and no homogeneous concentration is achieved.

Accordingly, it is an object of the invention to provide a reactor of relatively compact construction for carrying out heterogeneous reactions with a catalyst member.

It is another object of the invention to provide a reactor for heterogeneous reactions which can operate with a reduced pressure loss, satisfactory radial mixing and homogeneous concentration and temperature profiles.

It is another object of the invention to provide a reactor for heterogeneous reactions with a catalyst member which provides for satisfactory heat removal and reduced peak temperatures.

It is another object of the invention to facilitate catalytic reactions with high efficiency and good seal activity.

It is another object of the invention to simplify the scaling-up of laboratory units to relatively large production units.

Briefly, the invention provides a reactor for heterogeneous reactions which comprises a heat conductive wall defining a chamber, at least one inlet for introducing a flowable medium into the chamber, at lest one outlet for removing flowable medium from the chamber and a conveyor means for conveying a medium through the inlet into the chamber. In accordance with the invention, the reactor includes a catalyst member in the chamber for effecting a heterogeneous reaction therein. This catalyst member has at least two consecutively disposed stages of different orientation from each other in two different planes. Further, each stage has a preset height (H) and a preset diameter (D) or width and a plurality of flow guiding elements which define subflow ducts disposed in crossing relation to each other at an angle of inclination (W) of at least 10° relative to a vertical axis. In addition, the subflow ducts have partly opened flow-crossing places between the facing subflow ducts.

In accordance with the invention, each stage of the catalyst member has a displacement factor $H/H_O$ of at least $\frac{1}{2}$ wherein $H_O$ is equal to $D \, ctgW$.

Because of the subflow ducts, the heat evolved catalytically is removed rapidly to the heat-conductive reactor wall over the height of a stage of the catalyst member. Consequently, every subflow duct of a stage extends as far as the reactor wall. Also, due to the alternate arrangement of subflow ducts and flow-guiding elements in two different directions with partly open flow-crossing places inbetween a reduced pressure loss and good radial mixing and, therefore, homogeneous concentration and temperature profiles are achieved.

Heat exchange means, such as cooling or heating means are also disposed directly on the reactor wall and a control unit connected to such means and to the conveyor to optimize adjustment and operation of a required catalytic reaction.

By so devising the flow-crossing places that the open areas are smaller than the cross-sectional areas of the subflow ducts or less than half the area of the layer planes satisfactory mixing and homogenization throughout the reactor chamber and a high removal of heat to the reactor walls can be further optimized.

Appropriate flow-deflecting elements and subducts can be devised from wavy layers and by subducts which are in cross-section round or triangular or rectangular or square or trapezoidal. If the flow-guiding elements contact one another in the layer planes over a particular portion, the removal of heat to the wall can be increased.

Advantageous constructions of the flow-guiding elements can take the form of a heat-conducting metal skeleton having improved heat removal and coatings of alkaline earth or transition metal oxides, particularly aluminum oxide. The flow guiding elements may also have layers of solid ceramic material and washcoat coatings which are simple to prepare. Good reaction conditions can be achieved with specific areas of 20 to 200 m²/g (BET area of the catalyst support material or of the catalyst) and surface enlargements of 100 to 100,000 m²/m² (BET area/geometric substrate area).

By dividing the reactor member into at least two parts having different parameter values the reaction process over the length of the reaction can be further optimized. Also the catalyst member and the surrounding wall can be combined from a number of similar modules, thus greatly facilitating transport and assembly.

BRIEF DESCRIPTION OF THE DRAWINGS

These and other objects and advantages of the invention will become more apparent from the following detailed description taken in conjunction with the accompanying drawings wherein:

FIG. 5a schematically shows the ratio of opened areas to closed areas in a stage constructed in accordance with FIG. 4a;

FIG. 8b schematically illustrates the arrangement of the flow path in a catalyst member having three stages corresponding to the temperature pattern of FIG. 8a;

Figure 1:
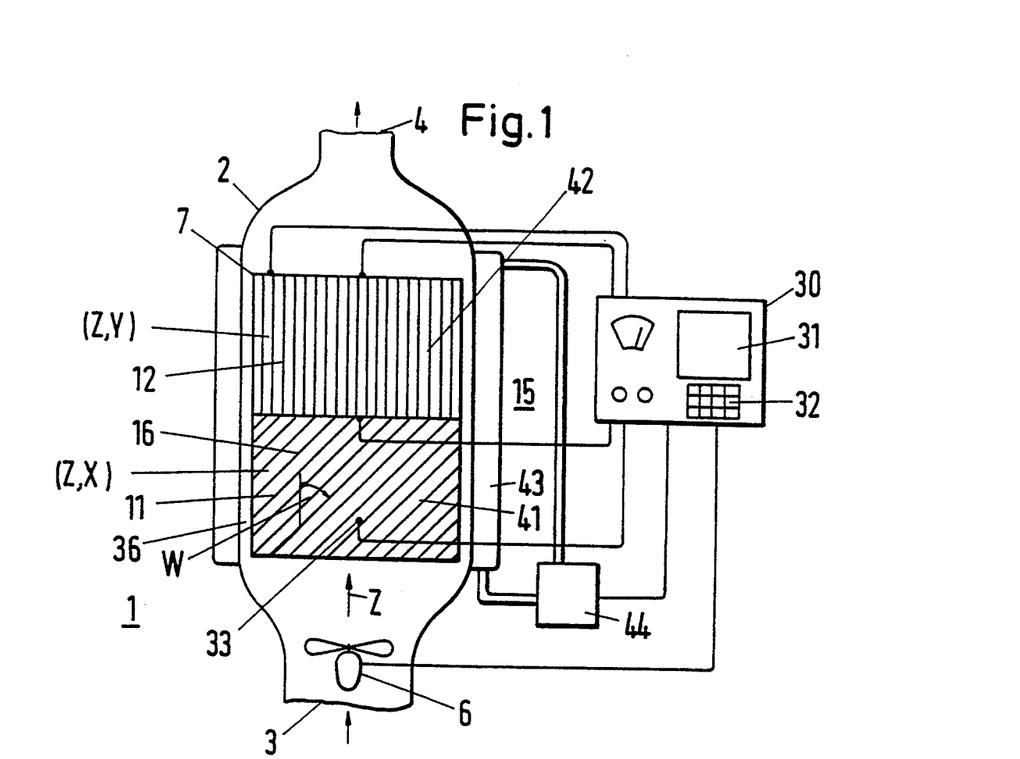
FIG. 1 illustrates a schematic cross sectional view of a reactor constructed in accordance with the invention having two catalyst member stages.

Referring to FIG. 1, the reactor is constructed for the heterogeneous reaction of a flowable medium such as a liquid or gaseous medium. As illustrated, the reactor 1 has a heat conductive wall 2 defining a chamber, at least one inlet 3 for introducing a flowable medium into the chamber and at least one outlet 4 for removing flowable medium from the chamber. In addition, a conveyor means 6 is provided for conveying the medium through the inlet 2 into the chamber. As indicated, the conveyor means may be in the form of a pump or blower.

Figure 3A:
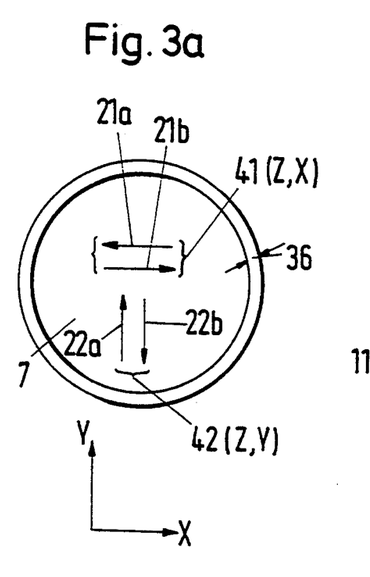
FIG. 3a illustrates a plan view of the reactor of FIG. 1 and the flow patterns within the respective stages in accordance with the invention.
Figure 3B:
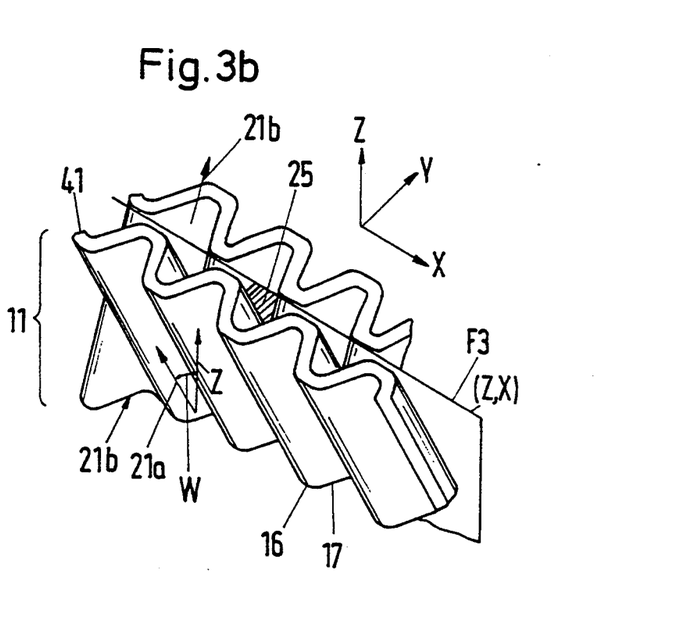
FIG. 3b illustrates a part perspective view of two layers of a stage of the reactor of FIG. 1 in accordance with the invention.

In addition, a catalyst member 7 in the form of a packing is provided in the chamber for effecting a heterogeneous reaction therein. This catalyst member has two consecutively disposed stages 11, 12 of different orientation from each other in two different planes. Each stage 11, 12 is embodied by flow-guiding elements 16 which are arranged in parallel layers 41, 42 and which form subflow ducts 21,22. FIG. 3 shows the physical arrangement of the elements 16 relative to the main flow direction Z and the spatial axes X, Y, Z.

Referring to FIG. 3a, the flow ducts 21 of the layers 41 are disposed parallel to the plane (Z, X) and the flow ducts 22 of the layers 42 are disposed parallel to the plane (Z, Y). All the elements 16 and the ducts 21, 22 formed thereby are inclined at an angle of inclination (W) of at least 10°, preferably from, 35° to 65°, to the flow direction Z and the layers are aligned alternately in the direction +W and −W so that crossing subflows 21a, 21b originate in the plane (Z, X). The flow directions 22a, 22b in the plane (Z, Y) are also aligned to the Z-axis at the angle W. This arrangement leads to partly open flow crossing places 25 between the subflow ducts (FIGS. 4 and 5) where a dosable partial mixing occurs. Catalyst is disposed at least on the surface of the flow-guiding elements 16 and in FIG. 3b on the wavy layers 17.

Figure 2:
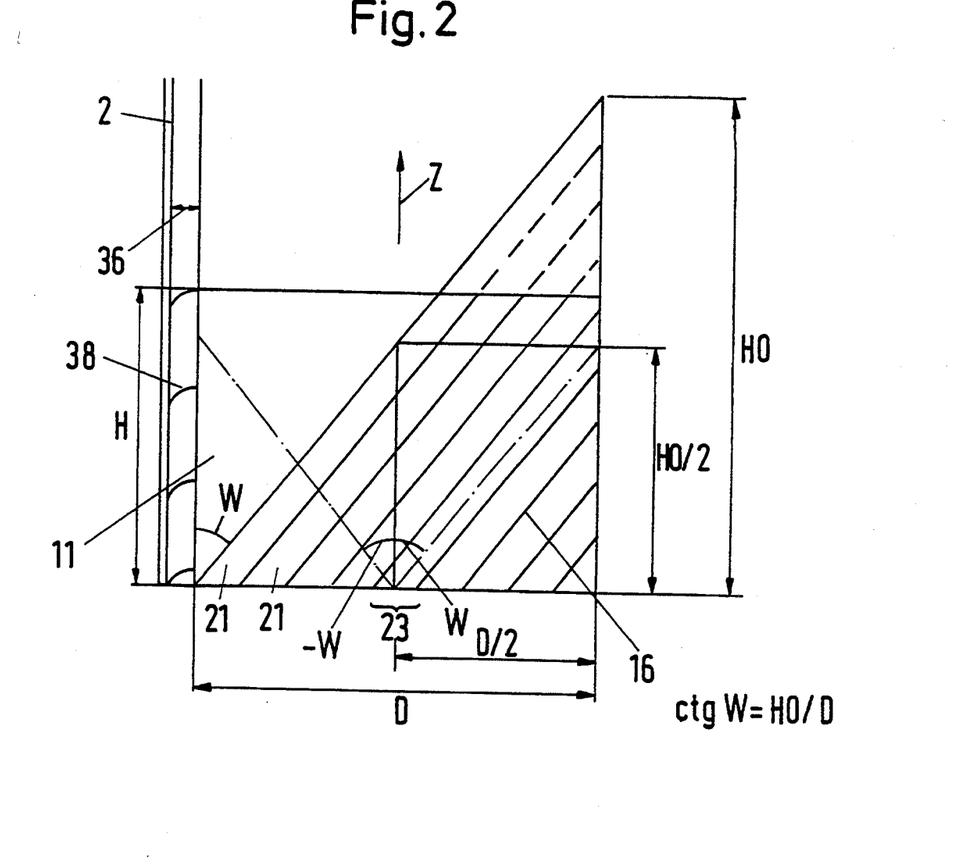
FIG. 2 diagrammatically illustrates the H/HO displacement factor of a stage.

The height H of a stage 11 of the catalyst member 7 is determined by the displacement factor H/HO of the stage 11 which will be explained with reference to FIG. 2. The height HO over which a subflow duct extends through a complete reactor body of diameter or thickness D is given by HO=D ctg W. For all the subflow ducts to extend completely as far as the heat-conductive reactor wall 2 over the whole flow cross-section of a single stage 11, similar considerations must apply to the duct 23 which starts from the center. The minimal stage height H must therefore be H=½ HO—i.e., the displacement factor H/HO must be at least ½.

As indicated in FIG. 1, a heat exchange means 15 for cooling or heating is disposed or acts on the reactor wall 2 and a control unit 30 is connected to the means 15 and conveyor 6. The means 15 can be, for example, air or water cooling means or, in the case of endothermal reactions, electric heating. A cooling jacket 43 and associated heat exchanger 44 are provided on the reactor in a closed circuit, the cooling which is provided by the heat exchanger 44 being adjusted and controlled by means of the control unit 30. Sensors 33 for temperature, pH values and concentrations detect the relevant parameters at various places in the reactor chamber. By means of a program section 31 and a data input 32 of the control unit 30, reactions can be programmed, optimized, supervised and automated as required.

By devising the cross-sectional shapes of the subducts, the open areas of the flow crossing places 25, the inclination angle W and stage height H, it is possible, in adaptation to flow speed, the medium and the heat evolution of the reaction, to achieve satisfactory cross-mixing with homogeneous concentrations patterns and rapid heat removal through the reactor wall 2 and, therefore, optimal performance of the reaction.

FIGS. 4a–4f diagrammatically illustrate various examples of possible cross-sectional shapes in which the subducts bounded by the flow-guiding elements have areas F2. The various cross-sectional shapes are rectangular 27 in FIG. 4a; square 28 in FIG. 4b; trapezoidal 24 and 29 in FIGS. 4c–4e and rounded triangular 26 in FIG. 4f. FIG. 3b shows another example in which the cross-section is rounded. As can be seen, the flow-guiding elements contact one another over a portion B in the layer planes so that the open area F1 of the flow-crossing places 25 is reduced correspondingly.

Figure 4A:
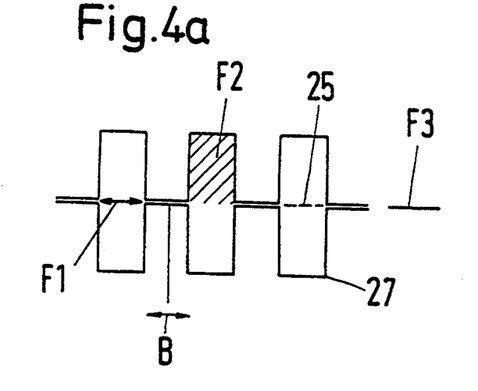
FIG. 4a schematically illustrates a subflow duct having a rectangular cross section in accordance with the invention.
Figure 4B:
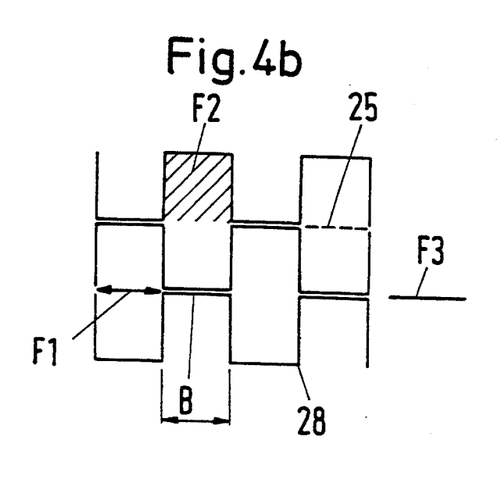
FIG. 4b schematically illustrates a subflow duct having a square cross-section in accordance with the invention.
Figures 4C, 5C:
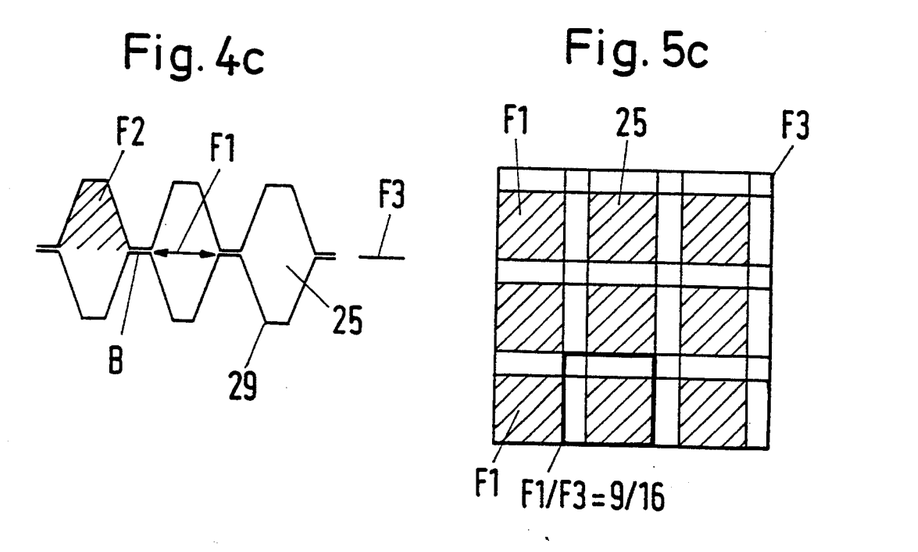
FIG. 4c illustrates a subflow duct having a trapezoidal cross section in accordance with the invention.
FIG. 5c illustrates the ratio of opened areas to closed areas for a stage constructed in accordance with FIG. 4c.
Figure 4D:
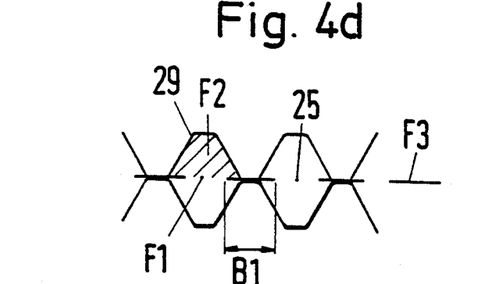
FIG. 4d illustrates a cross sectional view of a subflow duct having a modified trapezoidal cross section in accordance with the invention.
Figure 4E:
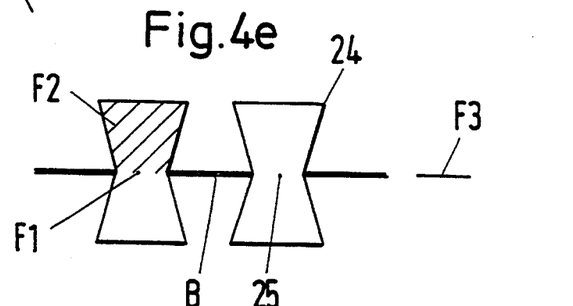
FIG. 4e shows a further modified subflow duct having a trapezoidal cross section in accordance with the invention.
Figure 4F:
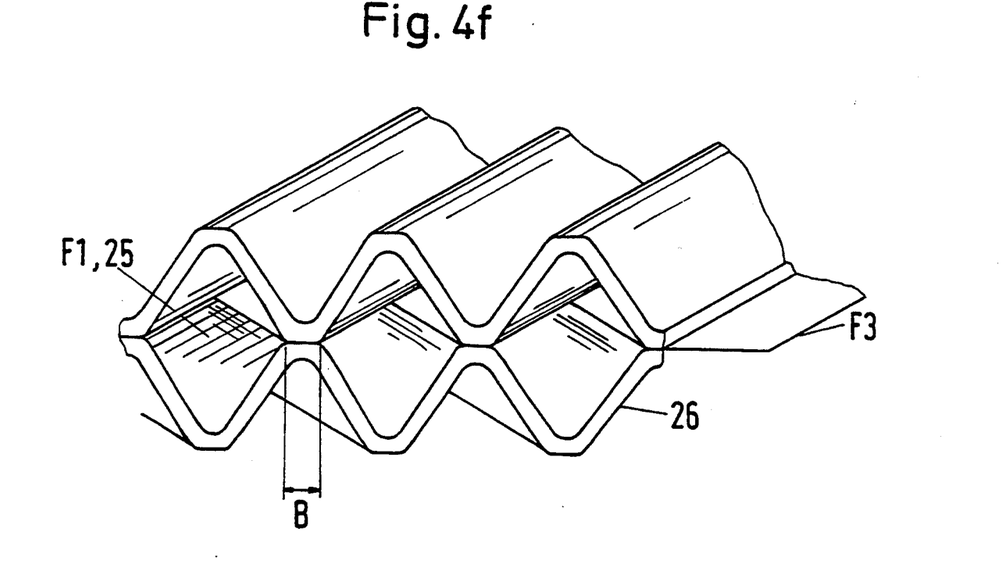
FIG. 4f illustrates a perspective view of two flow guiding elements defining subflow ducts of triangular cross section.

In line with the example shown in FIGS. 4a, 4b, 4c and 4g, the open areas F1 and the closed areas in the layer planes F3 are shown in FIGS. 5a, 5b, 5c and 5g. Two layers of flow-guiding elements contact one another or are joined together in the layer planes. The open areas F1 corresponding to the flow-crossing places 25 are shown hatched. As will be apparent, a required ratio of open areas F1 to total layer area F3 can be provided by shaping of the flow-guiding elements. An appropriate ratio of open areas F1 to cross-sectional areas F2 of the subflow ducts can be devised similarly. At an angle W of 45° and, neglecting the finite layer thickness of the flow-guiding elements, the following values are obtained. For example, for the ratios F1/F2 and F1/F3:

| | | |
|---|---|---|
| FIG. 4a | F1/F2 = 2/3 | F1/F3 = 1/4 |
| FIG. 4b | F1/F2 = 1 | F1/F2 = 1/4 |
| FIG. 4c | F1/F2 = 3/2 | F1/F2 = 9/16 |
| FIG. 4d | F1/F2 = 1 | F1/F2 = 1/4 |
| FIG. 4e | F1/F2 = 4/9 | F1/F3 = 1/9 |

If B1 is enlarged the shape of FIG. 4d reaches the same values as the square of FIG. 4b.

Figure 4G:
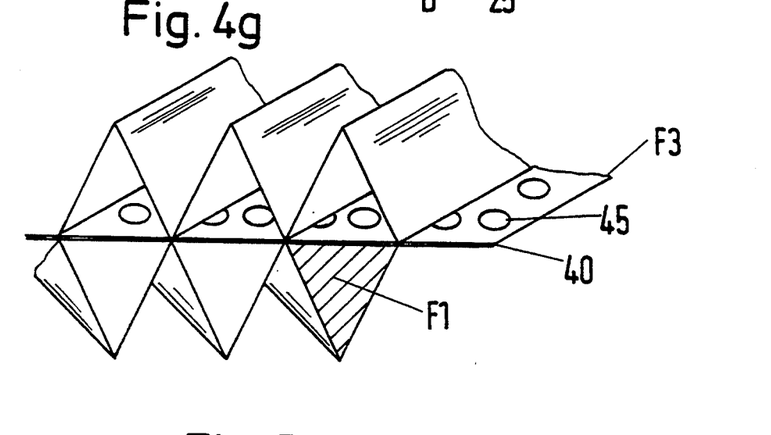
FIG. 4g illustrates a view similar to FIG. 4f with triangular subflow ducts and an intermediate aperture plate between the flow guiding elements in accordance with the invention.
Figure 5A:
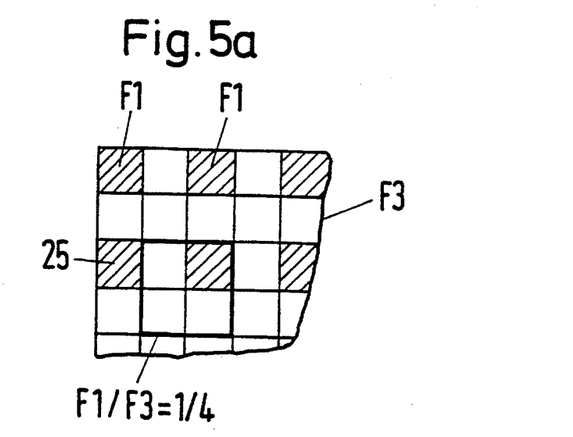
Figure 5B:
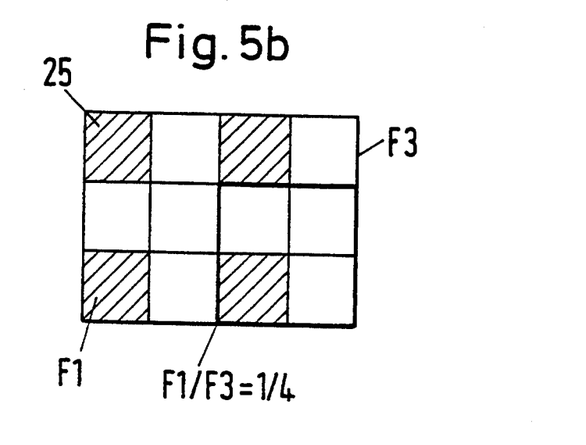
FIG. 5b illustrates the opened area to closed area ratios for a stage constructed in accordance with FIG. 4b.
Figure 5G:
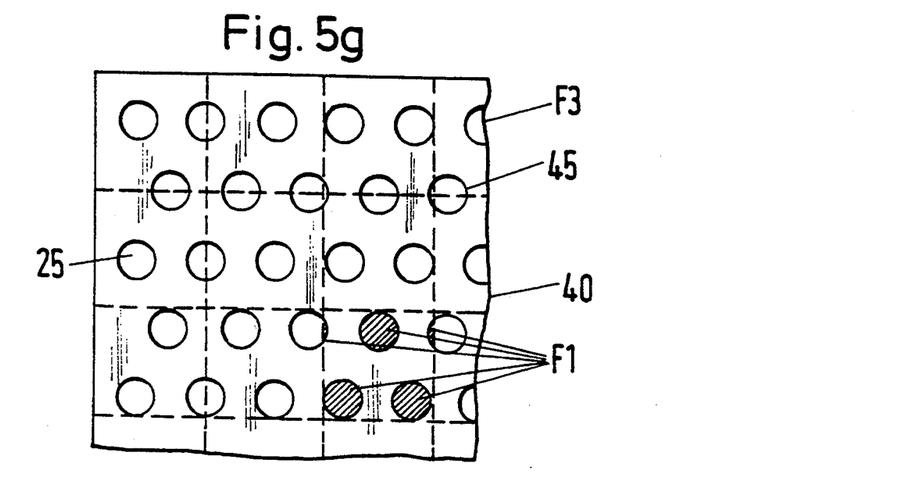
FIG. 5g illustrates a ratio of opened areas and closed areas in a stage constructed in accordance with FIG. 4g.

The surface ratios F1/F2 and F1/F3 can be reduced or optimized by the insertion of intermediate layers 40 (FIG. 4g) in the layer planes between the layers 41, 42, the intermediate layers being formed with orifices 45 corresponding to the areas F1. The intermediate layers 40 can be prepared, for example, from metal stampings and can be assembled with the layers 41, 42 to form stages of the catalyst member. In this construction, the orifices 45 in the intermediate layers need not register exactly with the position of the ducts and they can have some other periodicity or even be devoid of periodicity. FIGS. 4g and 5g show such an arrangement which is of triangular cross-section and in which the intermediate layers 40 are pierced with circular apertures.

These ratios F1/F2 and F1/F3 determine the mixing proportion between the ducts of adjacent layers.

Often, F1/F2 is with advantage $\leq 1$ and at least $\leq 1.5$ and F1/F3 is $\leq \frac{1}{2}$ and at least $\leq 0.7$.

Figure 6:
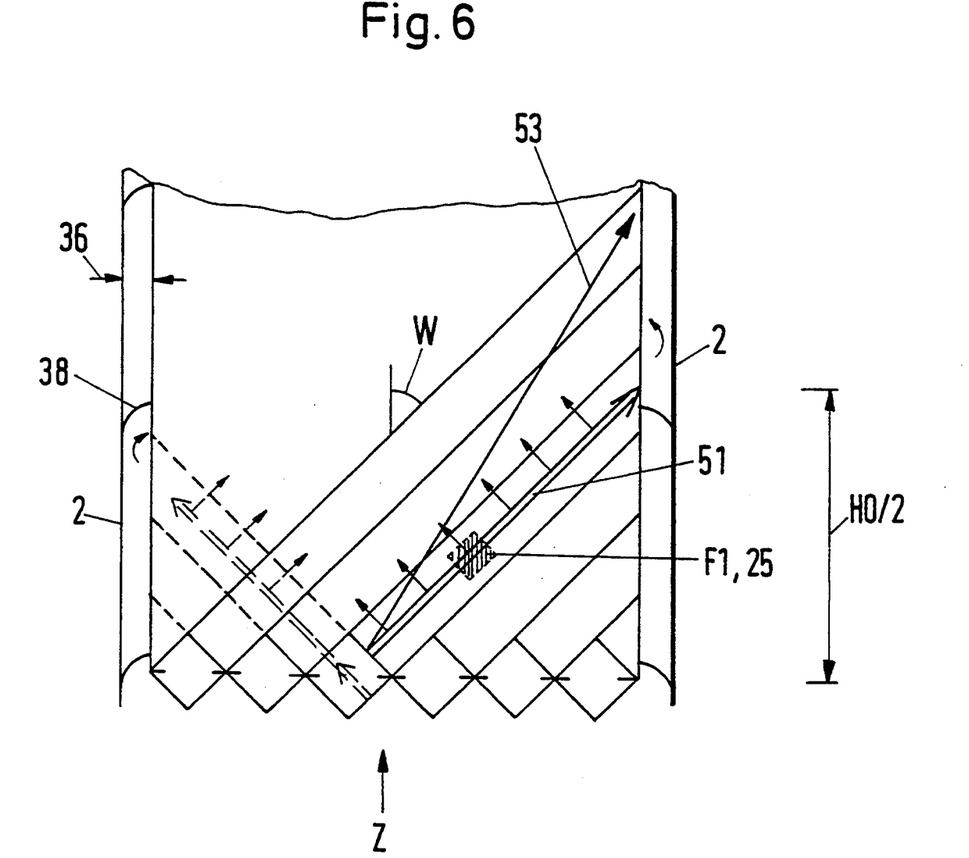
FIG. 6 illustrates the effect of the area ratios on homogenization and removal of heat.

As shown diagrammatically in FIG. 6, this leads at every flow-crossing place to a longitudinal component of the medium flow, such component remaining in a subflow duct, as the main component 51 and a cross-component 52 transferring to adjacent cross ducts. The area ratios are so adjusted with reference to the displacement factor H/HO that adequate cross-mixing and concentration homogenization simultaneously with satisfactory heat removal by way of the reactor wall are provided by the main component. To achieve satisfactory ratios, the sum of the cross components 52 should be of the same order of magnitude as the main component 51. Unlike known static mixer structures, the reactor of FIG. 1 does not produce a maximum transverse mixing effect but quite the opposite—i.e., a significantly reduced cross-mixing in order to optimize the main component. Cross components and main components can therefore co-operate to produce a particle flow in the reactor chamber substantially in the direction of the resultant 53—i.e., all the particles can, in principal, be guided to the reactor wall 2. To this end, the displacement factor H/HO can be at least 0.7, more particularly for high heat evolutions. However, depending upon catalytic reaction as little as 0.5 may be satisfactory.

An edge gap 36 (FIG. 6) is preferably of the same order of magnitude as the hydraulic diameter of the subflow ducts. Collar-like terminations 38 in the gap 36 return the reaction mixture to the ducts after heat exchange with the wall 2. To this end, at least one and preferably more than one collar 38 is or are disposed above each stage of the reactor member.

Figure 7A:
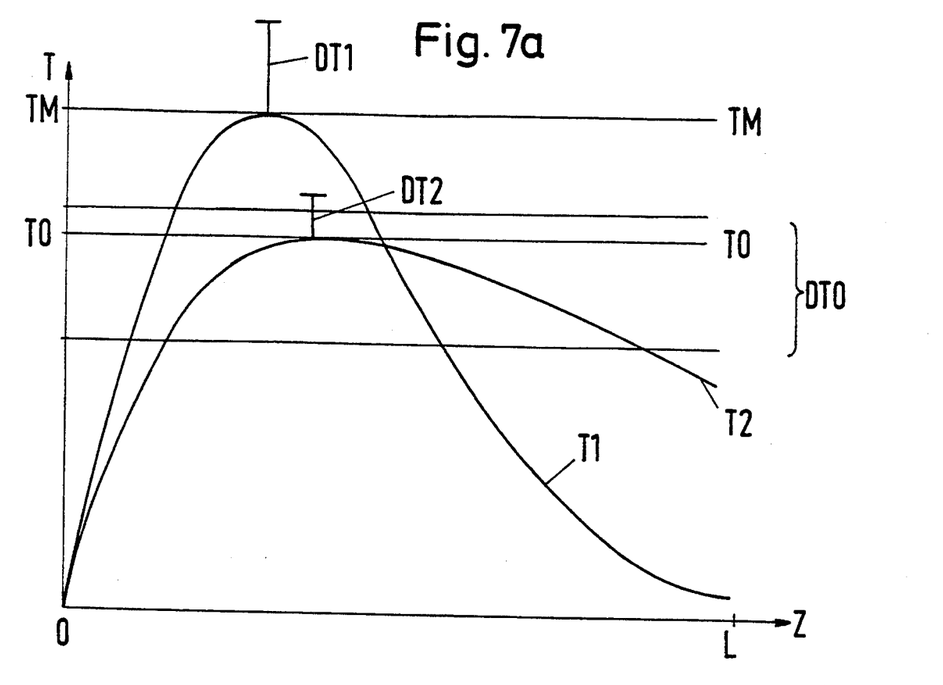
FIG. 7a illustrates temperature patterns of a reactor constructed in accordance with the invention in comparison with conventional reactors.
Figure 7B:
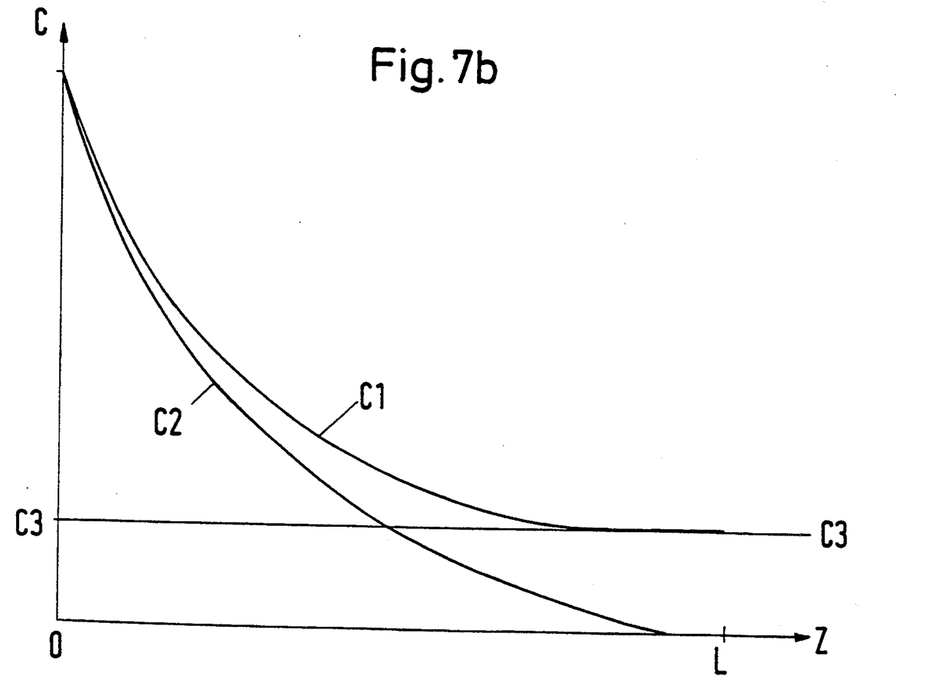
FIG. 7b illustrates concentration patterns of a reactor in accordance with the invention in comparison with a conventional reactors.

FIGS. 7a and 7b diagrammatically illustrate, with reference to an example, the pattern of the temperatures T—i.e., of the concentration C to be broken down catalytically—plotted against reactor length L in the main flow direction Z. The aim in conventional reactors is to provide a temperature pattern T1 with a rapid rise to high temperatures up to the maximum permissible temperature TM, followed by a relatively rapid decrease. In the case of the reactor of FIG. 1 according to the invention, however, because of efficient heat removal, the temperature T2 for a given reaction intensity rises only to the required optimal value T0, then decreases more slowly because of good homogenization—i.e., the temperature remains considerably longer in the optimal range DT0. Also, because of deliberately contrived mixing and homogenization effects, local temperature peaks and inhomogeneities DT2 are reduced, whereas in conventional reactors there are high local temperature peaks and inhomogeneities DT1 which exceed the maximum permissible temperature TM and which may therefore cause unwanted chemical reactions and destroy the catalyst.

Referring to the concentration pattern C (Z) of FIG. 7b, conventional reactors experience at C1 a more rapid flattening of the reaction with an unwanted residue C3, remaining as slip, at the end L of the catalyst member. On the other hand, the concentration C2 of the reactor according to FIG. 1 decreases smoothly and continuously to zero without slip occurring at the end L of the catalyst member.

Figure 8A:
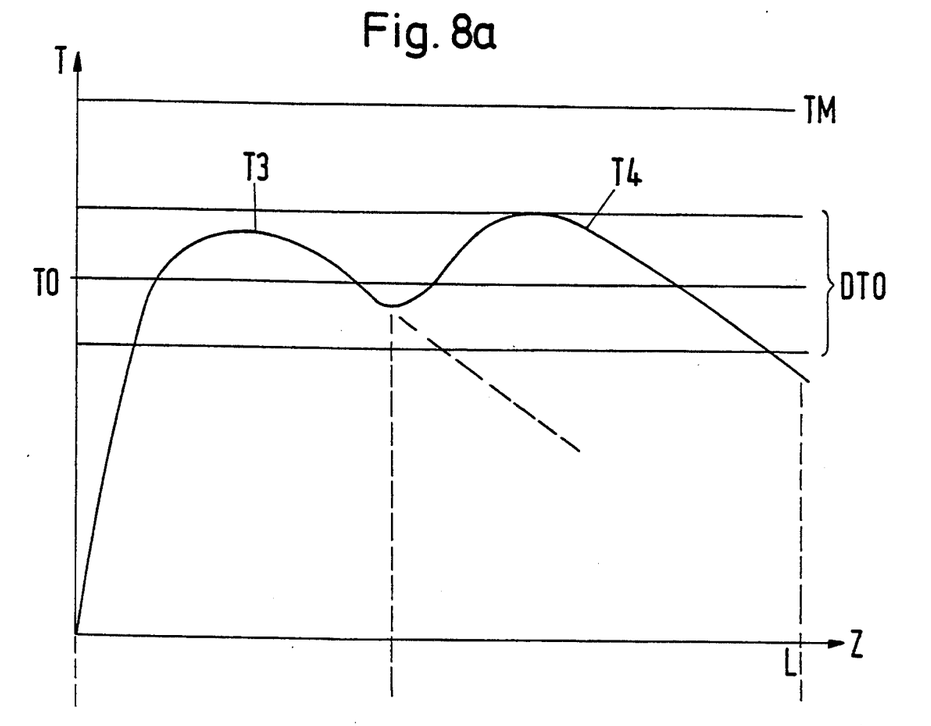
FIG. 8a shows a temperature pattern into parts of a catalyst member having three stages in accordance with the invention.

The reactor according to FIG. 1 can be further improved particularly for high efficiency and selectivity by dividing the reactor body into at least two parts having different geometric parameters of the flow-guiding elements and different catalyst coverings. In this connection, FIG. 8a shows the temperature pattern T3 and T4 in two parts 46, 47 of the catalyst member 7, with the stages 11, 13 and 14 of FIG. 8b. The parameters are so adjusted that increased heat removal and, correspondingly, a lower pattern of T3 is achieved in the first stage 46. In the second stage, however, increased reactivity with a corresponding re-rise of the temperature T4 is set up. The temperature pattern T3, T4 can therefore be maintained overall very close to the optimal temperature T0 or in the optimal temperature range DT0, thus leading to more efficient use of the catalyst over the reactor length L and better selectivity benefitting the required chemical reaction.

For example, in the case of selective oxidations, the proportion of the required part-oxidized product can be increased and the proportion of the completely oxidized products (e.g., $CO_2$, $H_2O$) reduced.

Figure 8B:
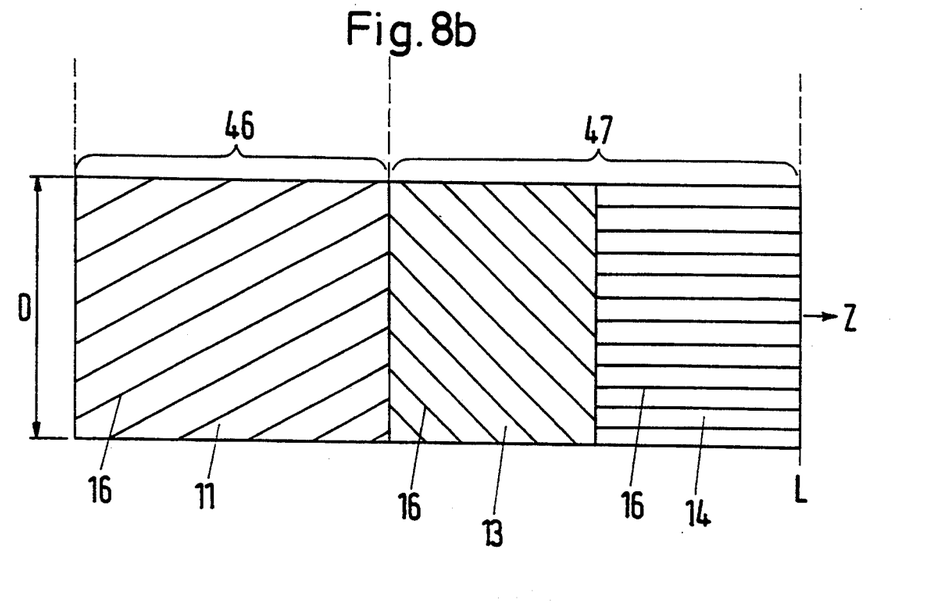

Increased heat removal in the first stage 46 is the result of smaller angles W, larger displacement factors H/HO, larger ducts and larger cross-sectional areas F2, smaller open crossing place areas F1, smaller catalyst surfaces and smaller catalyst coatings. Conversely, correspondingly increased reactivities and less removal of heat are set up in the second stage 47.

Figure 9:
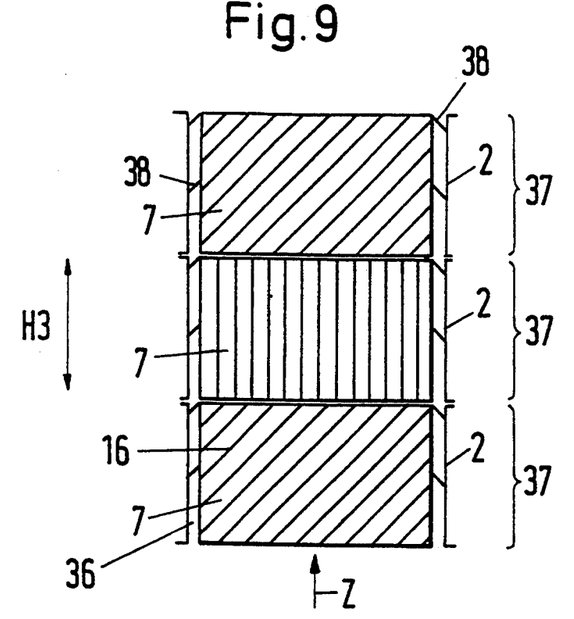
FIG. 9 illustrates a module for the construction of a reactor in accordance with FIG. 1.

To facilitate the carriage and assembly of large reactor units, the reactor may be combined from a number of similar modules 37 as shown in FIG. 9. Each module 37 consists of a part of a catalyst member 7 and associated surrounding wall 2. Preferably, the height H3 of a module 37 is at most of 2.4 meters in order to simplify road transport. At least at the top or bottom end of each module 37 the gap 36 is closed by a resilient collar 38.

The reactor can be round in cross-section as shown in FIG. 3a, or square or polygonal.

The elements 16 bounding the subflow ducts can be made as a whole of a catalytic material or be coated with such a material or have a catalytically activated surface.

Figure 10A:
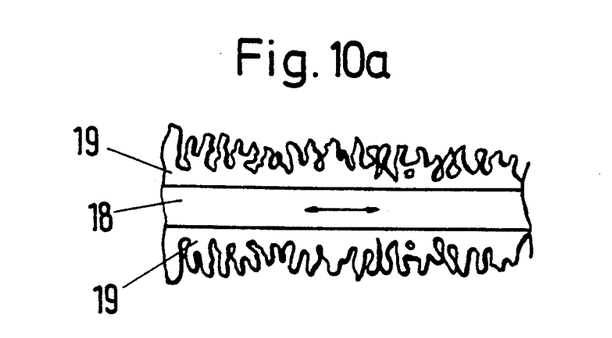
FIG. 10a illustrates a portion of a flow guiding element constructed in accordance with the invention with a catalytic coating thereon.

FIG. 10a shows a flow-guiding element 16 having a metal skeleton 18, for example, made of non-rusting steel plate, and a catalyst coating 19, the catalyst being applied at least to the surface. The metal skeleton 18 also contributes to heat removal and local temperature equalization.

Figure 10B:
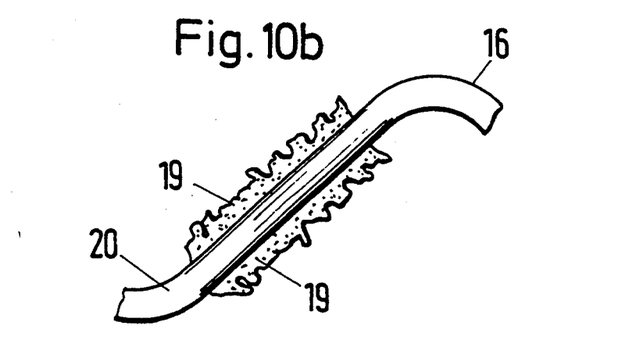
FIG. 10b illustrates a modified flow guiding element having a catalyst coating thereon in accordance with the invention.

FIG. 10b shows a flow-guiding element made of a solid ceramic layer 20, for example, of cordierite, mullite, steatite, silicon oxide and more particularly aluminium oxide with a coating 19. Particularly advantageous coatings having optimized surface enlargements on metal supports and, on solid ceramic layers, can be produced by washcoating.

What is claimed is:

1. A reactor for heterogeneous reactions comprising a heat conductive wall defining a chamber;
at least one inlet for introducing a flowable medium into said chamber;
at least one outlet for removing flowable medium from said chamber;
conveyor means for conveying a medium through said inlet into said chamber; and
a catalyst member in said chamber for effecting a heterogeneous reaction therein, said catalyst member having at least two consecutively disposed stages, each said stage having a plurality of flow guiding elements disposed in parallel to a main flow direction of the flowable medium through said chamber with said elements of one of said stages being angularly disposed relative to said elements of the other of said stages relative to said main flow direction, each said stage having a preset height (H), add a preset diameter (D) with each said flow guiding element defining subflow ducts disposed in crossing relation to the subflow ducts of an adjacent guiding element at an angle of inclination (W) of at least 10° relative to said main flow direction and with partly open flow-crossing places between facing subflow ducts, each stage having a displacement factor H/HO of at least ½ wherein HO is equal to D ctg W.

2. A reactor as set forth in claim 1 further comprising heat exchange means for exchanging heat with said wall.

3. A reactor as set forth in claim 2 wherein said heat exchange means includes a closed circuit for one of cooling and heating said wall.

4. A reactor as set forth in claim 2 which further comprises a control unit connected to said conveyor means and said heat exchange means for controlling the supply of medium to said chamber and the amount of heat exchange with said wall.

5. A reactor as set forth in claim 4 wherein said control unit has a program part, a data input and measuring inputs connected to sensors in said chamber.

6. A reactor as set forth in claim 1 wherein said angle of inclination (W) is from 35° to 65°.

7. A reactor as set forth in claim 1 wherein each open flow-crossing place is of an area less than the cross-sectional area of a subflow duct.

8. A reactor as set forth in claim 1 wherein the sum of the area of said flow-crossing places is less than one-half the area of a plane passing between a pair of said flow guiding elements.

9. A reactor as set forth in claim 1 wherein each subflow duct has a cross-sectional shape selected from the group consisting of round, triangular, rectangular, square and trapezoidal.

10. A reactor as set forth in claim 1 wherein adjacent flow guiding elements are in contact.

11. A reactor as set forth in claim 1 wherein said catalyst member is spaced from said wall to define an edge gap corresponding to the hydraulic diameter of said subflow ducts.

12. A reactor as set forth in claim 1 wherein at least some of said flow guiding elements include a metal skeleton and a catalyst coating on said skeleton.

13. A reactor as set forth in claim 1 wherein at least some of said flow guiding elements have a coating selected from the group consisting of at least one of alkaline earth, transition metal oxides and aluminum oxide.

14. A reactor as set forth in claim 1 wherein at least some of said flow guiding elements are of a solid ceramic selected from the group consisting of cordierite, mullite, steatite, aluminum oxide and silicon dioxide.

15. A reactor as set forth in claim 1 wherein at least some of said flow guiding elements have a coating of catalyst.

16. A reactor as set forth in claim 1 wherein a catalyst-carrying zone of each flow-guiding element has a specific area of from 20 to 200 $m^2/g$.

17. A reactor as set forth in claim 1 wherein each guiding element has a surface enlargement of from 100 to 100,000 $m^2/m^2$ referred to their geometric area.

18. A reactor as set forth in claim 1 wherein said catalyst member has at least two parts having different values as regards at least one of the geometry of said guiding elements and the catalyst coating.

19. A reactor as set forth in claim 1 wherein said catalyst member and said wall are combined from a number of similar modules.

20. A reactor for heterogeneous reactions comprising a heat conductive wall defining a chamber;
at least one inlet for introducing a flowable medium into said chamber;
at least one outlet for removing flowable medium from said chamber;
conveyor means for conveying a medium through said inlet into said chamber;

a catalyst member in said chamber for effecting a heterogeneous reaction therein, said catalyst member being spaced from said wall to define an edge gap and having at least two consecutively disposed stages, each said stage having a plurality of flow guiding elements disposed in parallel to a main flow direction of the flowable medium through said chamber with said elements of one of said stages being angularly disposed relative to said elements of the other of said stages relative to said main flow direction, each said stage having a preset height (H), and a preset diameter (D) with each said flow guiding element defining subflow ducts disposed in crossing relation to the subflow ducts of an adjacent guiding element at an angle of inclination (W) of at least 10° relative to said main flow direction and with partly open flow-crossing places between facing subflow ducts, each stage having a displacement factor H/HO of at least ½ wherein HO is equal to D ctg W; and a plurality of annular collars in said gap extending between said catalyst member and said wall for sealing adjacent coaxially disposed sections of said gap from each other.

21. A reactor for heterogeneous reactions comprising a heat conductive wall defining a chamber;

at least one inlet for introducing a flowable medium into said chamber;

at least one outlet for removing flowable medium from said chamber;

conveyor means for conveying a medium through said inlet into said chamber; and a catalyst member in said chamber for effecting a heterogeneous reaction therein, said catalyst member having at least two consecutively disposed stages, each stage having a plurality of vertically disposed corrugated plates with said plates of one stage being angularly disposed relative to said plates of the other stage, each stage having a preset height (H) and a preset diameter (D) with each plate defining subflow ducts between said corrugations thereof and disposed in crossing relation to each other at an angle of inclination (W) of at least 10° relative to a vertical axis and with partly open flow-crossing places between facing subflow ducts, each stage having a displacement faction H/HO of at least ½ wherein HO is equal to D ctg W.

* * * * *